United States Patent
Tyde, III et al.

(10) Patent No.: US 9,983,909 B1
(45) Date of Patent: May 29, 2018

(54) CONVERGED INFRASTRUCTURE PLATFORM COMPRISING MIDDLEWARE PRECONFIGURED TO SUPPORT CONTAINERIZED WORKLOADS

(71) Applicant: EMC Corporation, Hopkinton, MA (US)

(72) Inventors: Arthur F. Tyde, III, Sparks, NV (US); Nir Soffer, Austin, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 57 days.

(21) Appl. No.: 15/070,450

(22) Filed: Mar. 15, 2016

(51) Int. Cl.
G06F 9/455 (2018.01)
G06F 9/50 (2006.01)
G06F 9/48 (2006.01)

(52) U.S. Cl.
CPC .......... *G06F 9/5011* (2013.01); *G06F 9/4881* (2013.01)

(58) Field of Classification Search
None
See application file for complete search history.

(56) References Cited

U.S. PATENT DOCUMENTS

| | | |
|---|---|---|
| 8,417,747 B1 | 4/2013 | Hayden et al. |
| 8,898,402 B1 | 11/2014 | Stronge |
| 2008/0256607 A1 | 10/2008 | Janedittakarn et al. |
| 2012/0173488 A1 | 7/2012 | Spielberg et al. |
| 2012/0174113 A1 | 7/2012 | Pohlmann |
| 2012/0180039 A1 | 7/2012 | Bravery et al. |

(Continued)

FOREIGN PATENT DOCUMENTS

| | | |
|---|---|---|
| CN | 103810046 A | 5/2014 |
| CN | 103870314 A | 6/2014 |
| CN | 104104513 A | 10/2014 |

OTHER PUBLICATIONS

EMC Corporation, "VCE VXRack System 1000 Series: Hyper-Converged Infrastructure at Scale," The Virtual Computing Environment Company, EMC Converged Platforms, Feb. 17, 2016, 3 pages.

(Continued)

*Primary Examiner* — Gregory A Kessler
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement converged infrastructure including a plurality of containers. The converged infrastructure comprises one or more middleware layers configured to support containerized workloads running in respective ones of the containers using underlying commodity hardware. The one or more middleware layers comprise a container hub having a plurality of preconfigured containers for use with respective particular types of containerized workloads, a container engine adapted to provide the preconfigured containers for the container hub, and software-defined storage configured to provide storage resources for allocation by the container engine to the preconfigured containers. The preconfigured containers of the container hub illustratively comprise a plurality of open source software containers preconfigured for running respective particular types of open source software.

20 Claims, 3 Drawing Sheets

(56) References Cited

U.S. PATENT DOCUMENTS

| | | | |
|---|---|---|---|
| 2012/0246647 A1* | 9/2012 | Ciano | G06F 9/45533 718/1 |
| 2013/0145006 A1 | 6/2013 | Tammam | |
| 2014/0274408 A1 | 9/2014 | Dave | |
| 2014/0317618 A1 | 10/2014 | Behera et al. | |
| 2014/0366155 A1 | 12/2014 | Chang et al. | |
| 2015/0058861 A1 | 2/2015 | Zheng et al. | |
| 2015/0074058 A1 | 3/2015 | Zhao et al. | |
| 2015/0120928 A1 | 4/2015 | Gummaraju et al. | |

OTHER PUBLICATIONS sysdig.org, "Universal System Visibility with Native Container Support," 2015, 3 pages.
Encomium to Technology, "Dissecting Docker Security—Part 1," http://goo.gl/35Jr9D, Aug. 12, 2015, 3 pages.
Encomium to Technology, "Aesthetics of Linux Security Modules," http://goo.gl/x12gJD, Aug. 12, 2015, 3 pages.
Netlink, "Linux Programmer's Manual," http://man7.org/linux/man-pages/man7/netlink.7.html, Jan. 10, 2015, 7 pages.
U.S. Appl. No. 14/752,153 filed in the name of R. Wallner et al. filed Jun. 26, 2015 and entitled "Coordinated Resource Allocation Between Container Groups and Storage Groups."
U.S. Appl. No. 14/820,026 filed in the name of Vaibhav Khanduja et al. filed Aug. 6, 2015 and entitled "Provisioning Isolated Storage Resource Portions for Respective Containers in Multi-Tenant Environments."
EMC Corporation, "EMC ScaleIO," V1.32, User Guide, #302-001-033, Rev. 11, May 2015, 536 pages.
EMC Corporation, "EMC Scaleio Operation Overview—Ensuring Non-Disruptive Operation and Upgrade," EMC White Paper, Mar. 2015, 10 pages.
Wikipedia, "Docker (Software)," http://en.wikipedia.org/wiki/Docker_%28software%29, Mar. 7, 2015, 8 pages.
Docker, "Software-Defined NAS Filer for Shared NFS, CIFS, iSCSI and Cloud Storage with Docker," SoftNAS Cloud, 2015, 2 pages.
R. Saha et al., "Docker Offers Big Opportunity for Software-Defined Networking," IBM Corporation, Dec. 5, 2014, 10 pages.
Docker, "Implementing SoftNAS Cloud with Docker," SoftNAS Cloud, Nov. 2014, 21 pages.
W. Felter et al., "An Updated Performance Comparison of Virtual Machines and Linux Containers," IBM Research Report, RC25482, Jul. 21, 2014, 15 pages.
Christian Bryant, "LXC: Move Over Virtual Machines, Here Come Containers," tom'sIT PRO, http://www.tomsitpro.com/print/lxc-linux-containers-docker,news-1904.html, Apr. 24, 2014, 3 pages.
EMC Corporation, "Vblock FastPath Desktop Virtualization Platform: Modernize Your Desktop with a Purpose-Built Desktop Virtualization Solution," The Virtual Computing Environment Company, vmware, 2011, 2 pages.

* cited by examiner

CONVERGED INFRASTRUCTURE PLATFORM COMPRISING MIDDLEWARE PRECONFIGURED TO SUPPORT CONTAINERIZED WORKLOADS

FIELD

The field relates generally to information processing systems, and more particularly to virtualization in information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given information processing system. However, significant challenges can arise in the deployment of containers. For example, a need exists for a converged infrastructure platform that provides efficient mechanisms for implementation of containers to run open source software applications.

SUMMARY

Illustrative embodiments of the present invention provide converged infrastructure platforms comprising middleware that can be preconfigured to support a variety of containerized workloads, such as workloads involving execution of particular types of open source software applications.

In one embodiment, an apparatus comprises a processing platform that includes a plurality of processing devices each comprising a processor coupled to a memory. The processing platform is configured to implement converged infrastructure including a plurality of containers. The converged infrastructure comprises one or more middleware layers configured to support containerized workloads running in respective ones of the containers using underlying commodity hardware. The one or more middleware layers comprise a container hub having a plurality of preconfigured containers for use with respective particular types of containerized workloads, a container engine adapted to provide the preconfigured containers for the container hub, and software-defined storage configured to provide storage resources for allocation by the container engine to the preconfigured containers.

The container hub, container engine and software-defined storage may be implemented as respective separate middleware layers. Other types and arrangements of middleware layers can be used to provide these components in other embodiments.

The preconfigured containers of the container hub in some embodiments comprise a plurality of open source software containers preconfigured for running respective particular types of open source software.

Accordingly, the containerized workloads may comprise respective open source software applications. In such an arrangement, a given one of the open source software applications of a particular type runs in a corresponding one of the containers that is preconfigured for open source software applications of that type.

The commodity hardware illustratively comprises, for example, bare-metal physical hardware, or cloud-based virtual hardware. Other types of commodity hardware, or combinations of different types of commodity hardware, can also be used.

In some embodiments, the converged infrastructure comprises a plurality of preconfigured container appliances each having one or more processor cores with each of the one or more processing cores being configured to support a corresponding one of the preconfigured containers. The preconfigured container appliance may comprise, for example, a container blade device or a container application-specific integrated circuit.

Illustrative embodiments can provide significant advantages relative to conventional container arrangements. For example, challenges associated with deployment of containers in a wide variety of open source software contexts can be advantageously avoided through the use of a converged infrastructure platform having middleware preconfigured for open source containerized workloads.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
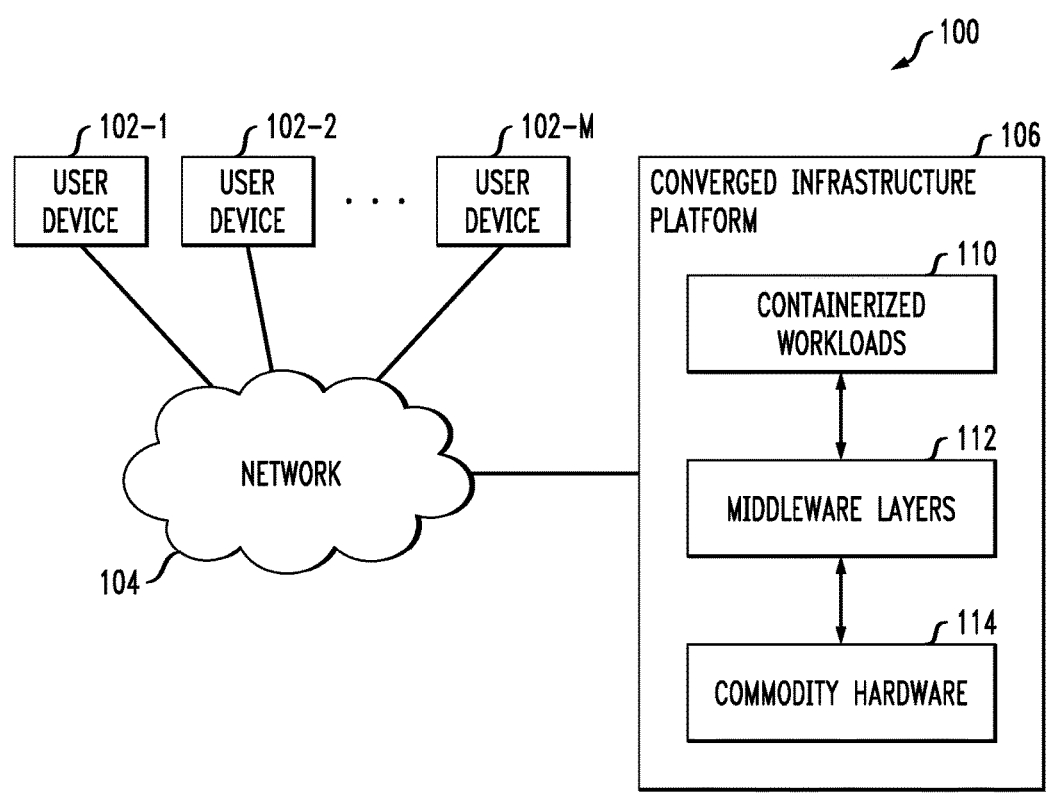
FIG. 1 is a block diagram of an information processing system comprising a converged infrastructure platform with middleware preconfigured to support containerized workloads in an illustrative embodiment.

FIG. 1 shows an information processing system 100 configured in accordance with an illustrative embodiment of the present invention. The information processing system 100 comprises a plurality of user devices 102-1, 102-2, . . . 102-M coupled via a network 104 to a converged infrastructure platform 106. The converged infrastructure platform 106 comprises a processing platform that itself includes a plurality of processing devices each having a processor coupled to a memory.

The user devices 102 in this embodiment can comprise, for example, desktop, laptop or tablet computers, mobile telephones, or other types of processing devices capable of communicating with the converged infrastructure platform 106 over the network 104.

The network 104 illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The converged infrastructure platform 106 is configured to implement converged infrastructure including a plurality of containers. Containerized workloads 110 run in respective ones of the containers. The containers are supported by middleware layers 112 that utilize underlying commodity hardware 114. More particularly, the converged infrastructure platform 106 in the present embodiment provides a container workload converged infrastructure solution that can be configured to run standardized, containerized workloads using the commodity hardware 114.

The converged infrastructure platform 106 in some embodiments is also referred to herein as a vDock platform. Such a vDock platform can be advantageously configured in accordance with a 3rd Platform application paradigm, which leverages decentralized, potentially unreliable commodity hardware and scale-out middleware, so as to facilitate a horizontal application deployment structure through the use of multiple software layers that are independently scalable and deployable.

Although the FIG. 1 embodiment illustratively includes multiple middleware layers, it is possible in other embodiments for the converged infrastructure platform 106 to be implemented using a single middleware platform. For example, functionality disclosed herein as being associated with separate ones of a plurality of middleware layers can in other embodiments be combined into a single middleware layer.

The containers implemented by the converged infrastructure platform 106 illustratively comprise respective Docker containers or other types of Linux containers (LXCs). For example, the converged infrastructure platform 106 can comprise a plurality of container host devices each implementing one or more containers. Each of the container host devices illustratively comprises at least one processor coupled to a memory. Such host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the converged infrastructure platform 106 using container cluster managers such as Docker Swarm or Kubernetes.

The commodity hardware 114 supporting the middleware layers 112 illustratively comprises, for example, bare-metal physical hardware, or cloud-based virtual hardware. Other types of commodity hardware, or combinations of different types of commodity hardware, can also be used.

As a more particular example, the commodity hardware 114 of the converged infrastructure platform 106 may comprise at least portions of VxRack™ or Vblock® converged infrastructure commercially available from VCE, the Virtual Computing Environment Company, an EMC Federation Company of the EMC Corporation of Hopkinton, Mass.

However, it is important to note that the middleware layers 112 in some embodiments are advantageously configured to run on a wide variety of different types of commodity hardware, including commercial off-the-shelf hardware from multiple distinct vendors, Open Compute Project hardware, as well as commodity hardware available from Infrastructure-as-a-Service (IaaS) providers. Thus, implementations of the converged infrastructure platform 106 can leverage various types of commodity hardware 114, including commodity hardware provided by public clouds.

At least portions of the converged infrastructure platform 106 are implemented using one or more processing platforms, examples of which will be described in greater detail below in conjunction with FIGS. 4 and 5. A given such processing platform comprises at least one processing device comprising a processor coupled to a memory, and the processing device may be implemented at least in part utilizing one or more virtual machines or other virtualization infrastructure.

Figure 2:
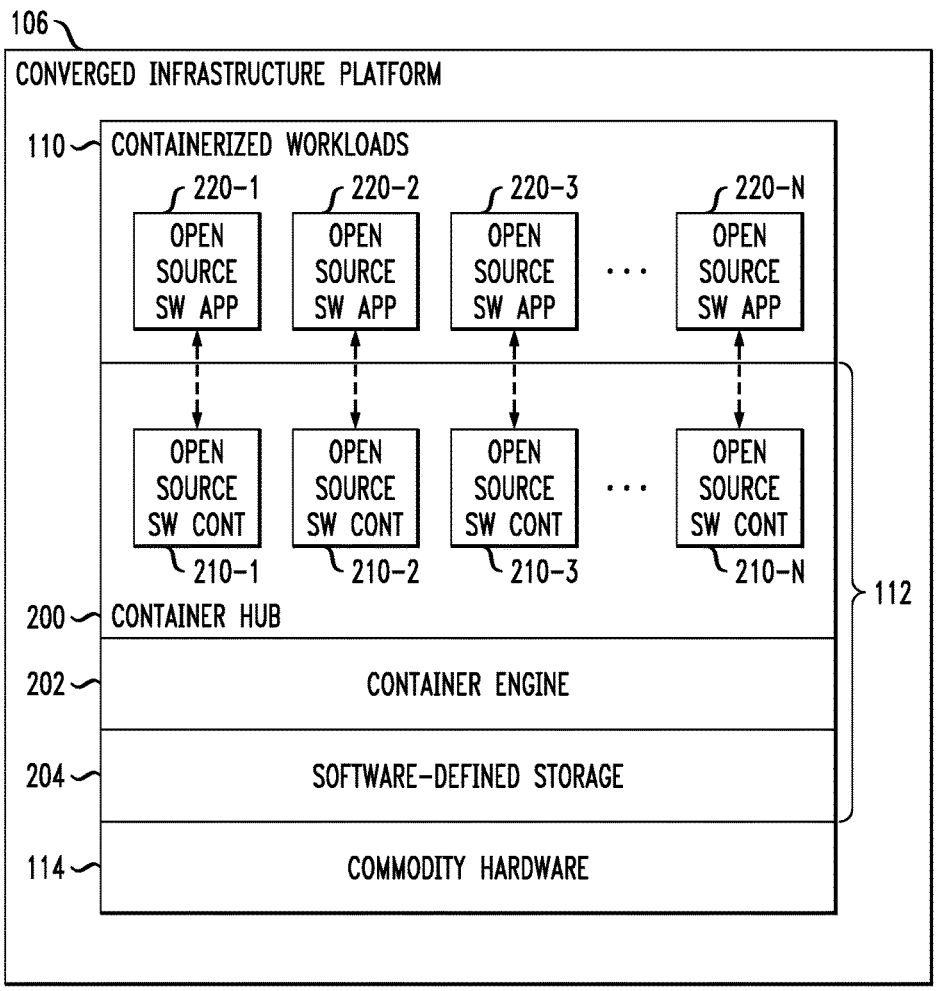
FIG. 2 shows a more detailed view of a converged infrastructure platform in an illustrative embodiment.

Referring now to FIG. 2, a more detailed view of the converged infrastructure platform 106 in an illustrative embodiment is shown. In this embodiment, the converged infrastructure platform 106 comprises middleware layers 112 configured to support containerized workloads 110 running in respective ones of a plurality of containers using underlying commodity hardware 114. The middleware layer 112 more particularly comprise a container hub 200, a container engine 202 and software-defined storage 204.

The container hub 200, container engine 202 and software-defined storage 204 in this embodiment are implemented as respective separate middleware layers of the set of middleware layers 112. As mentioned previously, alternative middleware layer arrangements are possible in other embodiments. For example, in some embodiments, functionality of the container hub 200 and the container engine 202 may be combined into a single common middleware layer.

The middleware layers 112 in the present embodiment are collectively implemented as a single software suite configured to run on the commodity hardware 114. Such a software suite can further comprise management and orchestration functionality for integration of the container hub 200, container engine 202 and software-defined storage 204.

At least portions of such management and orchestration functionality implemented in middleware layers 112 can be provided, for example, using components such as VCE Vision™ Intelligent Operations Software, or other types of management and orchestration components, including components from Pivotal Cloud Foundry, such as Lattice and Garden, and from EMC Project Caspian, or various combinations of multiple ones of these or other components. Other examples of management and orchestration components that may be implemented in a given embodiment include integration scripts or scriptlets configured in accordance with Puppet or Chef integration tools.

In some embodiments, the middleware layers 112 are made available to a user by a cloud service provider on a Software-as-a-Service (SaaS) basis. Such users may be associated with respective ones of the user devices 102 and may correspond to respective tenants of the cloud service provider. However, the term "user" in this context and elsewhere herein is intended to be more broadly construed so as to encompass, for example, human, hardware, software or firmware entities, as well as various combinations of such entities.

The container hub 200 includes a plurality of preconfigured containers for use with respective particular types of containerized workloads. The container engine 202 is configured to provide the preconfigured containers for the container hub 200, and the software-defined storage 204 is configured to provide storage resources for allocation by the container engine 202 to the preconfigured containers. For example, the software-defined storage 204 illustratively provides persistent, easily-accessible storage to each of the preconfigured containers of the container hub 200.

The preconfigured containers of the container hub 200 in this embodiment comprise a plurality of open source software containers 210-1, 210-2, . . . 210-N that are preconfigured for running respective particular types of open source software. The containerized workloads 110 comprise respective open source software applications 220-1, 220-2, . . . 220-N. A given one of the open source software applications 220 of a particular type runs in a corresponding one of the open source software containers 210 that is preconfigured for open source software applications of that type.

By way of example, the container hub 200 can include preconfigured containers for multiple distinct types of open source software, including open source databases software such as MySQL, PostGres, Cassandra, MongoDB, and many others. The preconfigured containers are advantageously configured to leverage features of their allocated storage resources provided by the software-defined storage 204. For example, a preconfigured container for a particular type of open source database application can be configured to leverage inherent replication functionality provided by the software-defined storage 204.

The container engine 202 provides the preconfigured containers 210 with respective sets of containerized compute resources that utilize corresponding allocated storage resources of the software-defined storage 204. For example, the allocated storage resources of the software-defined storage 204 illustratively comprise respective pluggable storage engines allocated to respective ones of the containers 210.

The container engine 202 is illustratively implemented as a Docker engine, although as indicated previously other types of containers can be used in other embodiments. The Docker engine is illustratively preconfigured to run on CoreOS, an open source lightweight operating system based on the Linux kernel and particularly configured to provide functionality for deploying applications in containers. Another example of a lightweight operating system suitable for use in implementing at least portions of the container engine 202 in some embodiments is VMware® Photon OS™ which has a relatively small footprint and is designed to boot extremely quickly on VMware® platforms.

The software-defined storage 204 in some embodiments is implemented using software-defined storage products such as ScaleIO™ or ViPR® both of which are commercially available from EMC Corporation.

For example, implementations utilizing ScaleIO™ for the software-defined storage 204 can advantageously support large numbers of preconfigured containers, overcoming scalability limitations inherent in certain conventional systems. Also, failure protection functionality provided by ScaleIO™ can be used to protect the containers 210 from failures in their allocated storage resources.

Additional details regarding ScaleIO™ functionality that can be incorporated into software-defined storage 204 in illustrative embodiments can be found in, for example, EMC ScaleIO™ User Guide, V1.32, Document No. 302-001-033, Rev. 11, May 2015, which is incorporated by reference herein.

In some embodiments, the converged infrastructure platform 106 comprises a plurality of preconfigured container appliances each having one or more processor cores with each of the one or more processing cores being configured to support a corresponding one of the preconfigured containers. The preconfigured container appliance may comprise, for example, a container blade device or a container application-specific integrated circuit (ASIC). Such preconfigured container appliances are considered examples of what are more generally referred to herein as "processing devices" of the converged infrastructure platform 106.

It should be understood that the particular arrangements of system and platform components as illustrated in FIGS. 1 and 2 are presented by way of example only. In other embodiments, only subsets of these system and platform components, or additional or alternative sets of components, may be used, and such components may exhibit alternative functionality and configurations.

For example, implementations of a vDock platform as described herein can comprise one or more appliances each of which includes both software and hardware, such as a combination of middleware layers 112 and commodity hardware 114. Other possible implementations of a vDock platform include software-only implementations which are configured to run on commodity hardware of other system entities, or SaaS implementations in which the vDock software is provided as a service to customers of a cloud service provider and runs on commodity hardware of the cloud service provider.

These are only a few examples of possible embodiments of the vDock converged infrastructure platform. Numerous other variants, including hybrid combinations of the above examples, will be apparent to those skilled in the art.

The operation of the information processing system 100 will now be described in further detail with reference to the flow diagram of FIG. 3. The process as shown includes steps 300 through 304, and is suitable for use in the system 100 but is more generally applicable to other systems comprising a converged infrastructure platform having middleware preconfigured to support containerized workloads. Accordingly, references to components of the embodiments of FIGS. 1 and 2 in the process description below should not be viewed as limiting in any way, as the disclosed process steps can be applied in a wide variety of other types of information processing systems.

In step 300, one or more middleware layers configured to support containerized workloads using underlying commodity hardware are implemented within converged infrastructure. As illustrated in the context of the FIG. 2 embodiment, the middleware layers 112 comprise container hub 200, container engine 202 and software-defined storage 204. In other embodiments, multiple such layers can be combined into a single middleware layer. For example, container hub and container engine functionality can be combined into a single middleware layer in an alternative embodiment.

In step 302, a plurality of preconfigured containers for use with respective particular types of containerized workloads are provided in the one or more middleware layers. Providing the preconfigured containers may comprise, for example, providing a plurality of open source software containers preconfigured for running respective particular types of open source software. In one possible implementation, the containerized workloads comprise respective open source software applications, and a given one of the open source software applications of a particular type runs in a corresponding one of the containers that is preconfigured for open source software applications of that type.

For example, with reference to the container hub 200 of FIG. 2, preconfigured open source software containers 210 are provided for use by respective ones of the open source software applications 220 of the containerized workloads 110.

In step 304, storage resources of software-defined storage of the one or more middleware layers are allocated to the preconfigured containers.

For example, the software resources may comprise respective storage engines provided by ScaleIO™ software-defined storage. Other types of allocable storage resources can be used in other embodiments. Such storage resources can be dynamically reconfigured responsive to changes in the storage needs of the containers. In addition, fault protection and other related functionality can provided to the containers via the ScaleIO™ software-defined storage.

Figure 3:
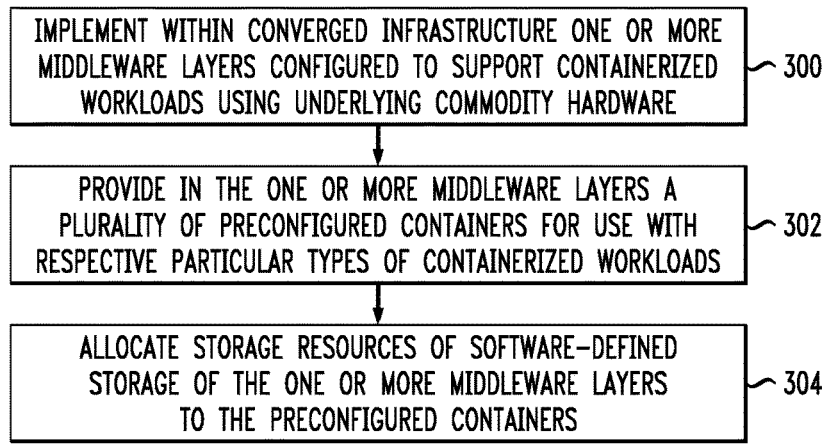
FIG. 3 is a flow diagram of an example process involving a converged infrastructure platform in an illustrative embodiment.

The particular processing operations and other system functionality described in conjunction with the flow diagram of FIG. 3 are presented by way of illustrative example only, and should not be construed as limiting the scope of the invention in any way. Alternative embodiments can use other types of processing operations involving a converged infrastructure platform comprising middleware preconfigured to support containerized workloads. For example, the ordering of the process steps may be varied in other embodiments, or certain steps may be performed concurrently with one another rather than serially. Also, one or more of the process steps may be repeated periodically for different processing instances, or performed in parallel with one another.

It is to be appreciated that functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments can provide considerable advantages over conventional container arrangements.

For example, challenges associated with deployment of containers in a wide variety of open source software contexts can be advantageously avoided through the use of a vDock platform or other converged infrastructure platform having middleware preconfigured for open source containerized workloads.

In some embodiments, a vDock platform provides users with convenient preconfigured converged infrastructure in which to acquire and deploy 3rd Platform open source software applications such as database applications, while also facilitating management of the corresponding containerized workloads.

A given vDock platform illustratively provides a developer-friendly turnkey solution for 3rd Platform implementations. It avoids the need for application developers to create their own tools in order to reliably develop and deploy an application. The vDock platform can be configured for frictionless integration with open source application programming interfaces (APIs), toolchains and other prepackaged application building blocks.

Moreover, the drawbacks of conventional hardware-centric approaches are avoided, as the vDock platform can be easily expanded without relying on a particular commodity hardware vendor.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 4:
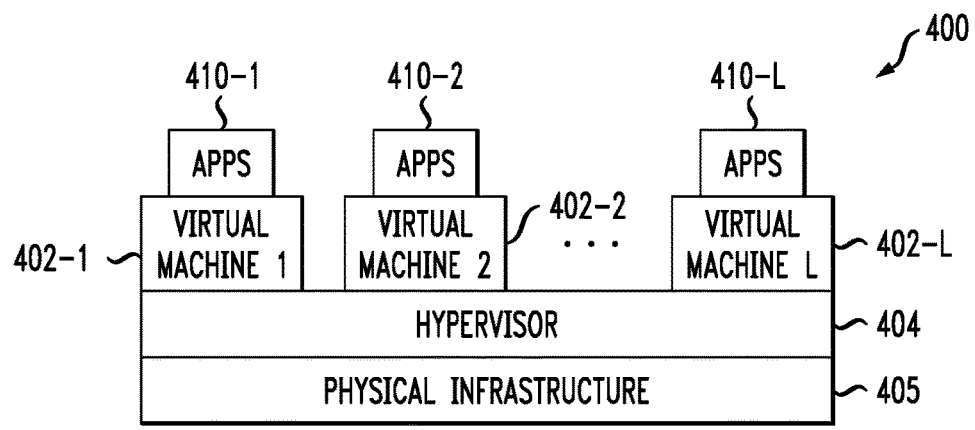
FIGS. 4 and 5 show examples of processing platforms that may be utilized to implement at least a portion of the information processing system of FIG. 1.
Figure 5:
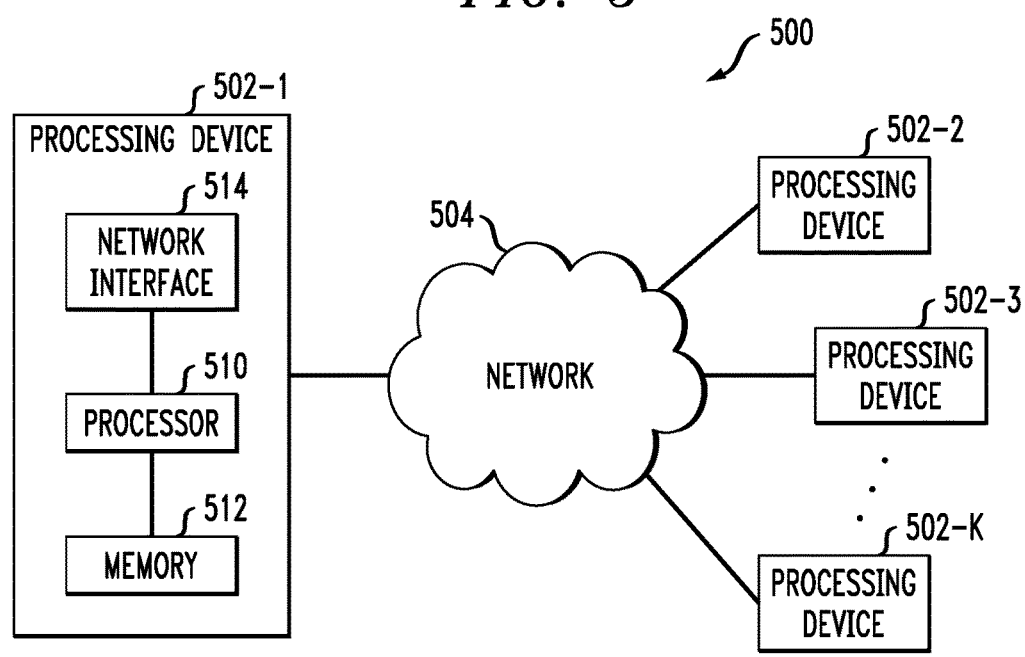

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

Although only a single hypervisor 404 is shown in the embodiment of FIG. 4, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 404 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

One or more of the processing modules or other components of system 100 may therefore each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an ASIC, a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to facilitate deployment of containerized workloads. Also, the particular configurations of system and device elements shown in the figures can be varied in other embodiments. Thus, for example, the particular type and configuration of middleware layers, containers and commodity hardware deployed in a given embodiment and their respective configurations may be varied. Other features of the illustrative embodiments such as containerized workloads, container hubs, container engines and software-defined storage can also be varied. Moreover, the various assumptions made above in the course of describing the illustrative embodiments should also be viewed as examples rather than as requirements or limitations of the invention. Numerous other alternative embodiments within the scope of the appended claims will be readily apparent to those skilled in the art.

What is claimed is:

1. An apparatus comprising:
a processing platform comprising a plurality of processing devices each comprising a processor coupled to a memory;
the processing platform being configured to implement converged infrastructure including a plurality of containers;
wherein the converged infrastructure comprises one or more middleware layers configured to support containerized workloads running in respective ones of the containers using underlying commodity hardware;
the one or more middleware layers comprising:
a container hub having a plurality of preconfigured containers for use with respective particular types of containerized workloads;
a container engine adapted to provide the preconfigured containers for the container hub; and
software-defined storage configured to provide storage resources for allocation by the container engine to the preconfigured containers;
wherein the converged infrastructure comprises a plurality of preconfigured container appliances each having one or more processor cores with each of the one or more processing cores being configured to support a corresponding one of the preconfigured containers;
wherein the plurality of preconfigured container appliances comprise:
a first preconfigured container appliance having at least a first processor core configured to support a first preconfigured container for use with a first type of containerized workload for a first open source software application; and at least a second preconfigured container appliance having at least a second processor core configured to support a second preconfigured container for use with a second type of containerized workload for a second open source software application different than the first open source software application.

2. The apparatus of claim 1 wherein the preconfigured containers of the container hub comprise a plurality of open source software containers preconfigured for running respective particular types of open source software.

3. The apparatus of claim 1 wherein the containerized workloads comprise respective open source software applications.

4. The apparatus of claim 3 wherein a given one of the open source software applications of a particular type runs in a corresponding one of the containers that is preconfigured for open source software applications of that type.

5. The apparatus of claim 1 wherein the containers comprise respective Linux containers.

6. The apparatus of claim 1 wherein the container hub, container engine and software-defined storage are implemented as respective separate middleware layers of the one or more middleware layers.

7. The apparatus of claim 1 wherein the commodity hardware comprises at least one of bare-metal physical hardware and cloud-based virtual hardware.

8. The apparatus of claim 1 wherein the container engine provides the preconfigured containers with respective sets of containerized compute resources that utilize corresponding allocated storage resources of the software-defined storage.

9. The apparatus of claim 1 wherein the allocated storage resources of the software-defined storage comprise respective pluggable storage engines allocated to respective ones of the containers.

10. The apparatus of claim 1 wherein the one or more middleware layers are collectively implemented as a single software suite configured to run on the commodity hardware.

11. The apparatus of claim 1 wherein the one or more middleware layers further implement management and orchestration functionality for integration of the container hub, container engine and software-defined storage.

12. The apparatus of claim 1 wherein the one or more middleware layers are provided to a user by a cloud service provider on a software-as-a-service basis.

13. The apparatus of claim 1 wherein a given one of the preconfigured container appliance comprises at least one of a container blade device and a container application-specific integrated circuit.

14. A method comprising:

implementing within converged infrastructure one or more middleware layers configured to support containerized workloads using underlying commodity hardware;

providing in the one or more middleware layers a plurality of preconfigured containers for use with respective particular types of containerized workloads; and allocating storage resources of software-defined storage of the one or more middleware layers to the preconfigured containers;

wherein the converged infrastructure comprises a plurality of preconfigured container appliances each having one or more processing cores with each of the one or more processing cores being configured to support a corresponding one of the preconfigured containers;

wherein the plurality of preconfigured container appliances comprise:

a first preconfigured container appliance having at least a first processor core configured to support a first preconfigured container for use with a first type of containerized workload for a first open source software application; and at least a second preconfigured container appliance having at least a second processor core configured to support a second preconfigured container for use with a second type of containerized workload for a second open source software application different than the first open source software application; and wherein the method is performed in a processing platform comprising a plurality of processing devices each comprising a processor coupled to a memory.

15. The method of claim 14 wherein providing the preconfigured containers comprises providing a plurality of open source software containers preconfigured for running respective particular types of open source software.

16. The method of claim 14 wherein the containerized workloads comprise respective open source software applications and wherein a given one of the open source software applications of a particular type runs in a corresponding one of the containers that is preconfigured for open source software applications of that type.

17. A computer program product comprising a non-transitory processor-readable storage medium having stored therein program code of one or more software programs, wherein the program code when executed by a processing platform comprising a plurality of processing devices causes the processing platform:

to implement within converged infrastructure one or more middleware layers configured to support containerized workloads using underlying commodity hardware;

to provide in the one or more middleware layers a plurality of preconfigured containers for use with respective particular types of containerized workloads; and to allocate storage resources of software-defined storage of the one or more middleware layers to the preconfigured containers;

wherein the converged infrastructure comprises a plurality of preconfigured container appliances each having one or more processing cores with each of the one or more processing cores being configured to support a corresponding one of the preconfigured containers; and wherein the plurality of preconfigured container appliances comprise:

a first preconfigured container appliance having at least a first processor core configured to support a first preconfigured container for use with a first type of containerized workload for a first open source software application; and at least a second preconfigured container appliance having at least a second processor core configured to support a second preconfigured container for use with a second type of containerized workload for a second open source software application different than the first open source software application.

18. The computer program product of claim 17 wherein providing the preconfigured containers comprises providing a plurality of open source software containers preconfigured for running respective particular types of open source software.

19. The computer program product of claim 17 wherein the containerized workloads comprise respective open source software applications and wherein a given one of the open source software applications of a particular type runs in a corresponding one of the containers that is preconfigured for open source software applications of that type.

20. The apparatus of claim 1 wherein the software-defined storage is configured to dynamically reconfigure storage resources allocated to the preconfigured containers responsive to changes in storage needs of the preconfigured containers.

\* \* \* \* \*